United States Patent [19]
Heard et al.

[11] 3,798,425
[45] Mar. 19, 1974

[54] TARGET MOTION COMPENSATOR

[75] Inventors: James L. Heard, Torrance; Eugene W. Opittek, Tustin; Larry G. Rands, Torrance, all of Calif.

[73] Assignee: Hughes Aircraft Company, Culver City, Calif.

[22] Filed: Aug. 29, 1972

[21] Appl. No.: 284,502

[52] U.S. Cl. .... 235/150.27, 235/61.5 S, 235/150.2, 343/5 DP
[51] Int. Cl. .......................... G06f 15/50, G01s 9/14
[58] Field of Search....... 235/150.2, 150.53, 150.27; 343/5 R, 5 DP, 5 SC

[56] References Cited
UNITED STATES PATENTS

| | | | |
|---|---|---|---|
| 3,368,217 | 2/1968 | Musso | 343/5 R |
| 3,523,293 | 8/1970 | Chandler | 343/5 R |
| 3,646,588 | 2/1972 | Van Popta | 343/5 DP |
| 3,680,105 | 7/1972 | Goldstone | 343/5 DP |
| 3,705,936 | 12/1972 | Wilmot et al. | 343/5 DP |

FOREIGN PATENTS OR APPLICATIONS 1,274,472  8/1968  Germany ....................... 235/150.27

*Primary Examiner*—Felix D. Gruber
*Attorney, Agent, or Firm*—W. H. McAllister, Jr.; Walter J. Adam

[57] ABSTRACT

A digital scan converter stores the range and azimuth coordinates of target hits furnished by an aircraft radar processing system. The information is thereafter read out of the memory at a desired rate into a display system. The present invention compensates the stored target hit coordinates for the motion of the aircraft carrying the radar processor. The compensation of the stored targets is achieved by updating this information during memory recirculation.

5 Claims, 3 Drawing Figures

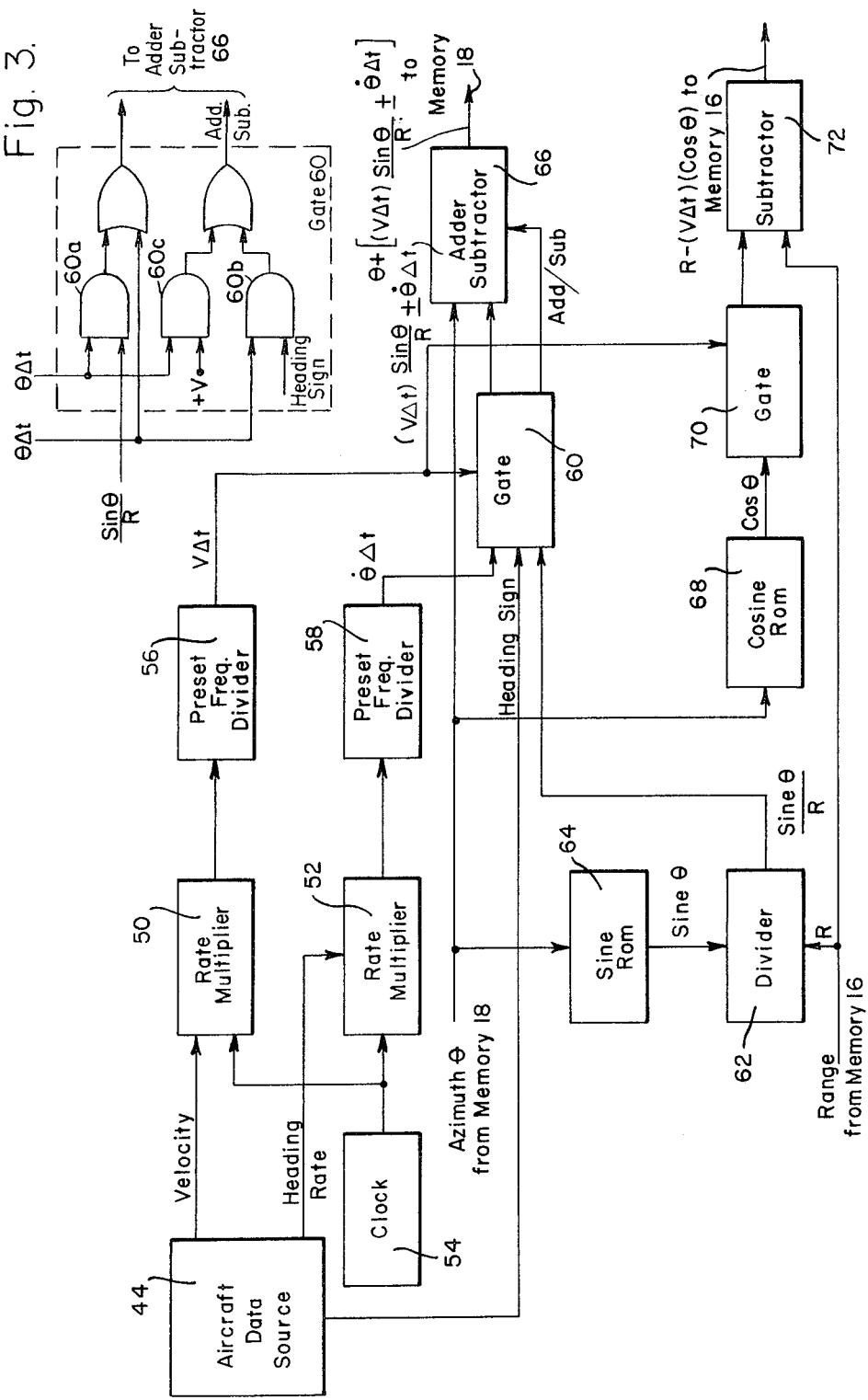

3,798,425

TARGET MOTION COMPENSATOR

CROSS-REFERENCES TO RELATED APPLICATIONS

In an application for "Coordinate Store Digital Scan Converter" filed Nov. 28, 1969, Ser. No. 880,630 by Heard, et al. which is assigned to a common assignee, there is described a digital scan converter sensor display whereby a small digital memory is utilized to store the coordinates of target hits which are provided by a radar processor. Amongst other information, the radar processor provides range and azimuth information. As the information in the memory is circulated, an age code associated with the data for each target hit is decremented at a desired rate in order not only to distinguish all target information from new target information, but also to enable the replacement of target information when the code indicates a certain predetermined age has been reached. Also, as the memory has circulated for the purpose of sequentially reading out and re-entering the target hit data in memory store, provision is made to compare the circulated target data with incoming target data, and if the comparison indicates this incoming target data is the same or quite similar, the incoming target data is not stored, whereby multiple storage for the data for the same target is avoided.

This invention provides for an improvement whereby as the target data is circulated, range and heading data from the aircraft is added to or subtracted from the target data, as the case may be, so that the target data is corrected or updated to compensate for the aircraft motion.

BACKGROUND OF THE INVENTION

This invention relates to radar digital scan converter systems, and more particularly, to improvements therein.

OBJECTS AND SUMMARY OF THE INVENTION

An object of this invention is the provision of an arrangement whereby target hit data provided by a radar system, which is stored in memory may be updated to compensate for aircraft motion.

Another object of this invention is the provision of a novel and useful system for updating data in a scan converter system in accordance with the motion of an aircraft. Still another object of this invention is to minimize the possibility of memory saturation by ground returns.

The foregoing and other objects of the invention may be achieved in an arrangment wherein a digital data representative of target hits, is stored in a circulating memory. This data is circulated from the output to the input of the memory, and at that time it is displayed and also compared with incoming data to determine whether or not the incoming data should be stored, or is nearly redundant data. At that time also, in accordance with this invention, incoming data generated by the aircraft is employed to alter the target hit data to reflect the changed position of the aircraft. To properly compensate the stored azimuth position for the change in aircraft position, the aircraft velocity and the heading change are taken into consideration. The required azimuth change due to velocity is generated by digitally multiplying the digital representation of the sine of the azimuth angle of the stored target by a function of the reciprocal of the range of the stored target. This then is added to or subtracted from the stored azimuth as determined by the direction of the change of the heading of the aircraft. The change in range is a function of the cosine of the aircraft azimuth angle. This incremental amount is subtracted from the stored range position at a rate proportional to the aircraft velocity.

The novel features of the invention are set forth with particularity in the appended claims. The invention will best be understood from the following description when read in conjunction with the accompanying drawings.

BRIEF DESCRIPTION OF THE DRAWINGS

FIG. 2 is a block schematic diagram of an embodiment of this invention.

FIG. 3 is a schematic gating diagram of a typical arrangement of the gate 60 of FIG. 2.

DESCRIPTION OF THE PREFERRED EMBODIMENTS

Figure 1:
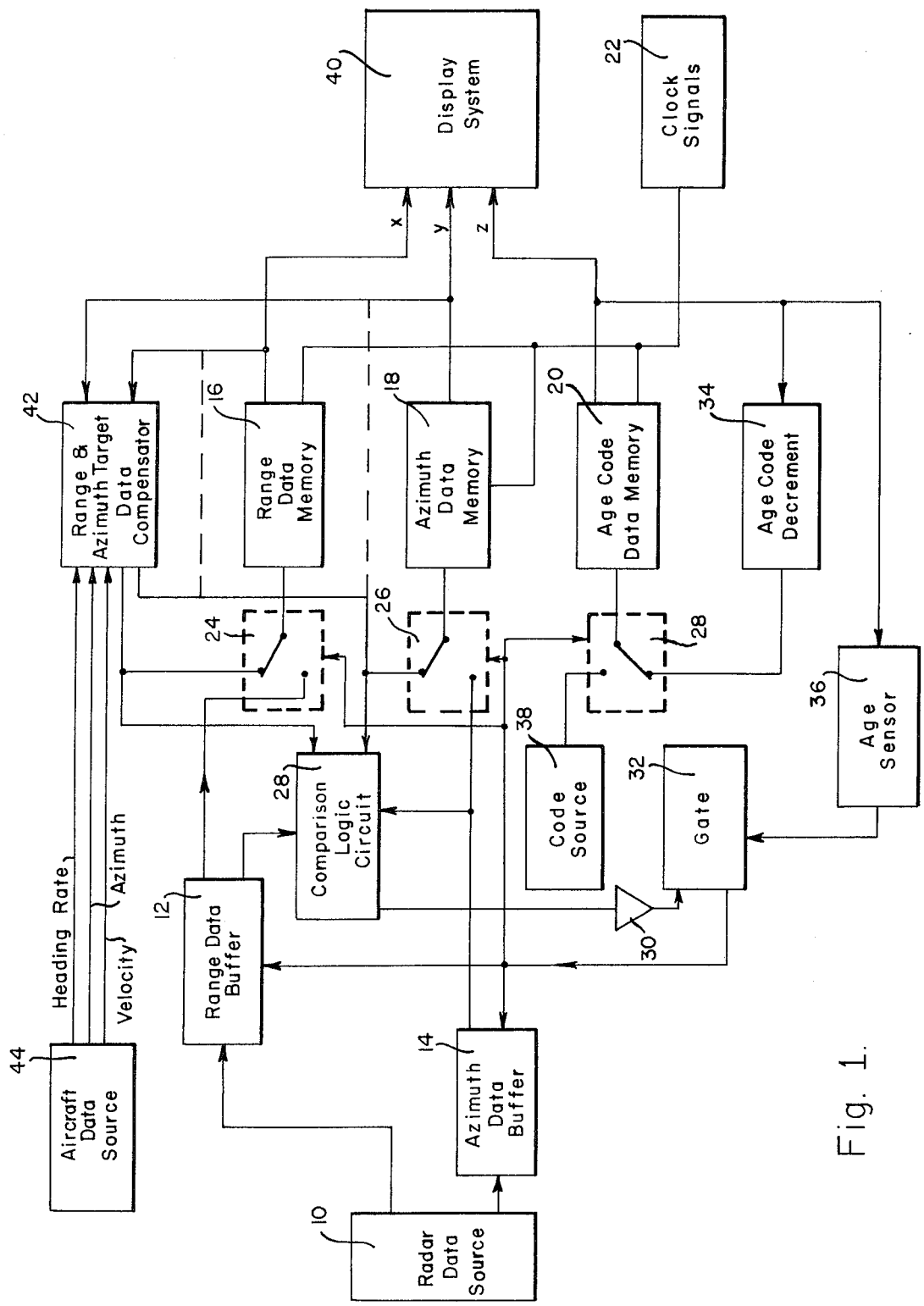
FIG. 1 is a simplified block diagram of a data scan converter of the type with which this invention may be employed.

FIG. 1 is a simplified block diagram of a radar digital scan converter sensor display system of the type briefly described previously, and which is described in full detail in the application to Heard et al., Ser. No. 880,630, filed Nov. 28, 1969. It is shown in this application for the purpose of providing and understanding of the location at which this invention connects into the digital scan converter in order to update the target information, which is displayed.

Referring now to FIG. 1, a radar data source 10, amongst other information, provides azimuth information in digital form, and range information. This information is entered into a range data buffer 12, and an azimuth data buffer 14, until such time as this information can be correlated with the infomation already on store in the memory, and also until this information can be entered into the memory. The memory preferably comprises a number of serial, circulating shift registers, designated as range data memory 16, azimuth data memory 18, and age code data memory 20. These memories are continuously circulating the data therein in response to clock signals from a clock signal source 22. At the input to each one of the memories, there is provided electronic circuitry which can be considered to be equivalent to a single pole, double-throw switch, respectively 24, 26 and 28. When the data in the memory is being recirculated, the switch contacts have the position shown.

The data in the range data buffer and in the azimuth data buffer are applied to circuitry defined as comparison logic, 28. To this comparison logic there is also applied the circulating data from the range data memory and the azimuth data memory. The comparison logic compares the circulated data with the data in the buffers. The output of the comparison logic circuit which indicates whether a range and azimuth comparison condition has been met, is applied through an inverter 30, to a gate 32.

The age code data is circulated from the output of its memory through an age code decrement circuit 34 to the input to the memory. The age code decrement circuit is a subtraction circuit which subtracts 1 from the age code data being passed therethrough. Thus, the age code is decremented until it reaches a predetermined level, such as zero. This zero level is sensed at the output of the memory 20, by an age sensor 36. When the age sensor determines the output of the age code data memory as 000, or some other predetermined combination of data bits, it applies an output to the gate 32.

Should the comparison logic circuit determine that there is no correspondence so that a range and azimuth comparison condition has not been met between the circulated target data and the buffer target data, then gate 32 is enabled to apply an output to the buffers and to the single pole, double-throw switches 24, 26, and 28, which, in the case of the range data memory and azimuth data memory, enables entry of the data in the buffers into the memories, in place of the circulated data. In the case of the age code data memory, a suitable maximum age code such as 111, in the case of a 3-bit age code, is entered into the memory from a 111 code source 38. The memories thereafter continue to circulate their data. The range, and the azimuth data are applied to a display system to provide the X- and Y-coordinates for indication of a target. The age code which is applied to the display system 40, is Z input or brightness of the target.

It should be appreciated that the foregoing comprises a brief description of a data scan system of the type with which this invention may be employed. The place at which the present invention is connected into a data scan conversion system, for the purpose of updating the circulated target data is at the two locations within the circulating loops of the range data memory and the azimuth data memory. These locations are represented by the dotted lines in the circulating loops, and when this invention is employed, connection is made to a range and azimuth target data compensator 42. This circuit arrangement has applied thereto, from an aircraft data source 44, the aircraft heading rate, azimuth and velocity, which is usually provided in digital form. The output of the range and azimuth target compensator to the range data memory will be the updated range data, and to the azimuth data memory will be the updated azimuth data.

Referring now to FIG. 2, there may be seen a block schematic diagram of an embodiment of this invention. It effectively comprises a small digital computer for calculating the required azimuth delta due to velocity of the aircraft and the required range delta. The required azimuth delta due to velocity is generated by digitally multiplying the digital representation of the sine of the azimuth angle ($\theta$) by a function of the reciprocal of the range of the stored target, ($R$). Expressed as a formula, this is $$\Delta\theta = (V\Delta t)(\sin \theta/R) + \dot{\theta}\Delta t \tag{1}$$

As for the range delta, this is a function of the cosine of the azimuth angle and may be expressed as:

$$R = (V\Delta t)(\cos \theta) \tag{2}$$

In FIG. 2, the aircraft data source 44 supplies the aircraft velocity data to a first rate multiplier 50 and the heading rate data to a second rate multiplier 52. The second inputs to these rate multipliers comprises the output of a clock source 54, which can; for example, be on the order of 1 MHz. As is well known, the outputs of the respective rate multipliers comprise pulse trains respectively having a frequency determined by the velocity and the heading rate values. The outputs from the respective rate multiplier 50, 52, are applied to preset frequency dividers, 56, 58 which are used for the purpose of establishing the desired scaling factor for these functions.

The pulse train output of the preset frequency divider 56 is the analog of $V\Delta t$, and the pulse train output of the preset frequency divider 58 is the analog of $\dot{\theta}\Delta t$. The $V\Delta t$ output is applied to a gate circuit 60 for the purpose of enabling the other inputs to the gate to be added at a rate determined by $V\Delta t$.

The digital range data from the circulating memory 16, is applied to a divider circuit 62 as a divisor. The dividend input to the divider 62, is the output of a "read only memory" 64, that, in response to the azimuth data input from the azimuth memory 18, provides the sine of the azimuth, ($\sin \theta$) to the divider 62. Thus, the output of the divider is $\sin \theta/R$. This is applied to the gate 60, along with the $\dot{\theta}\Delta t$ output of the preset frequency divider and the sign bit of the heading rate data, which is received from the aircraft data source 44. For every $V\Delta t$ pulse, the gate 60 will develop $V\Delta t \sin\theta/R$ which is applied to an adder-subtractor 66 to be added to $\theta$. For every $\dot{\theta}\Delta t$ pulse, the quantity is added or subtracted from $\theta$. Thus, the adder 66 output is the sum shown in the equation $\theta + [(V\Delta t)\sin\theta/R \pm \dot{\theta}\Delta t]$. Addition is always performed in the adder-subtractor 66 in the absence of $\dot{\theta}\Delta t$ but during the presence of $\dot{\theta}\Delta t$, the gate 60 responds to the Heading Sign signal to determine if addition or subtraction is to be performed.

Referring now also to FIG. 3 which is an illustration of one circuit arrangement for performing the operation of the gate 60, and AND gate 60a may be coupled to receive the $V\Delta t$ and the $\sin\theta/R$ terms to apply a ($V\Delta t$)$\sin\theta/R$ signal through a first OR gate to the adder-subtractor unit 66. The signal line $\dot{\theta}\Delta t$ is coupled to an input terminal of the first OR gate to apply each $\dot{\theta}\Delta t$ pulse to the output lead to be added or subtracted as determined by the Heading Sign signal on a lead coupled to an AND gate 60b along with the $\dot{\theta}\Delta t$ lead, which gate is in turn coupled through a second OR gate to the add/subtract line which controls the adder-subtractor unit 66. An AND gate 60c is also provided with one input coupled to a +$V$ terminal providing an add potential and a second input coupled to the $V\Delta t$ lead to pass a continuous add signal through the second OR gate to the unit 66 in the presence of a $V\Delta t$ signal.

The adder-subtractor 66 adds or subtracts $\dot{\theta}\Delta t$ from the azimuth data $\theta$ from memory, in accordance with the heading rate sign and always adds $V\Delta t \sin \theta/R$ to $\theta$ when present. The output of the adder-subtractor 66, is written back into memory 18.

The azimuth data from the memory is also applied to a cosine "read only memory" 68. This memory provides as its output the cosine function of the azimuth data, or cosine $\theta$. This cosine $\theta$ output is applied to a gate 70, which is enabled at a rate determined by the output of the preset frequency divider 56. Thus, the output of the gate 70 is the function ($V\Delta t$)($\cos \theta$). The output of the gate 70 is applied to a subtractor 72, to be subtracted from the range data. The output of the subtractor 72 is applied as an input to the range data memory 16.

The update in both range and azimuth may not necessarily be performed on each recirculation of the memory. The frequency of this updating is directly proportional to the aircraft velocity or heading rate and therefore, the rate multipliers are used to alter the frequency of the fixed reference clock for this purpose.

By providing motion compensated targets, ground returns to the same point on the ground will lie on top of one another. By providing the target correlation function, only one return will be stored for coincident ground returns, thereby minimizing the chance of memory saturation. As a result, small, less expensive memories can be utilized. Another advantage is the improved display format resulting from motion compensation. Realistic target velocities and directions can easily be obtained by looking at the display. Ground target apparent motion also gives a good indication of aircraft motion.

There has accordingly been described and shown herein a novel and useful system for compensating target hit displays, which have been introduced into a display scan converter, for aircraft motion.

What is claimed is:

1. A system for compensating target hit data, stored in a circulating memory, for the motion of an aircraft said target hit data includes azimuth and range data, comprising:
    means for providing aircraft motion data including velocity, heading rate, and heading sign data,
    first computing means for generating compensating data from said aircraft motion data and target hit data includes means for generating $(V\Delta t)$ $(\sin \theta)/R$ data and $\dot{\theta}\Delta t$ data where $V\Delta t$ is the velocity of the aircraft per unit of time, $\sin \theta/R$ is the sin of the azimuth angle divided by the range and $\dot{\theta}\Delta t$ is the change in the heading rage per unit of time, and
    second computing means for generating $(V\Delta t)$ $(\cos \theta)$ from said aircraft motion data and said target hit data and means coupled to said computing means and responsive to said target hit data for combining said compensating data with said target hit data as it is circulated between the output and input of said circulating memory.

2. A system as recited in claim 1 wherein said means for generating $(V\Delta t) \sin \theta/R$ and $\dot{\theta}\Delta t$ includes first rate multiplier means to which said velocity data is applied for producing an output representative of $V\Delta t$,
    second rate multiplier means to which said heading rate data is applied for producing and output representative of $\dot{\theta}\Delta t$,
    first read only memory means to which said azimuth data is applied for producing and output representative of $\sin \theta$,
    divider means to which said sine $\theta$ output and said range data is applied for producing and output representative of $\sin \theta/R$, and
    said computing means including gate means to which said $V\Delta t$ output is applied as a gating signal, and said $\sin \theta/R$ and $\dot{\theta}\Delta t$ signals are applied to produce outputs representative of $(V\Delta t)$ $(\sin \theta/R)$ and $\dot{\theta}\Delta t$.

3. A system as recited in claim 2 wherein said means for generating $(V\Delta t)(\cos \theta)$ comprises:

second read only memory means to which said azimuth data is applied for producing an output representative of $\cos \theta$,
gate means to which said $\cos \theta$ output is applied, and
means to apply said $V\Delta t$ output to said gate means as a gating signal to produce as an output representative of $(V\Delta t)(\cos \theta)$.

4. In a system wherein an aircraft has a scan converter which includes a circulating memory for storing target hit data including azimuth and range data, apparatus for compensating said target hit data for aircraft motion as it is circulated between the output and input of said memory comprising:
    means for deriving signals representative of the azimuth data of a target ($\theta$) from the output of said circulating memory,
    means responsive to said azimuth data signals to provide signals representative of $\sin \theta$,
    means for deriving signals representative of the range data ($R$) of said target from the output of said circulating memory,
    means for dividing $\sin \theta$ signals by said range data signals to produce signals representative of $\sin \theta/R$,
    means on said aircraft for providing signals representative of aircraft velocity ($V$) and heading rate ($\dot{\theta}$) data, and heading sign
    means responsive to said velocity representative signals for generating signals representative of velocity per unit of time ($V\Delta t$),
    means for multiplying $\sin \theta/R$ representative signals by the $V\Delta t$ representative signal to produce signals representative of $(V\Delta t)$ $(\sin \theta/R)$,
    means responsive to said heading rate representative signals for generating signals representative of heading rate per unit of time $\dot{\theta}\Delta t$,
    means responsive to said heading at sign and the signals representative of heading rate per unit of time $\dot{\theta}\Delta t$ for generating add subtract control signals,
    means responsive to said heading sign for combining the $(V\Delta t)$ $(\sin \theta/R)$ signals and the $\dot{\theta}\Delta t$ signals with the azimuth signals derived from memory to provide compensated azimuth signals,
    means for applying said compensated azimuth signals to the input of said memory,
    means responsive to said azimuth signals for generating signals representative of cosine of said azimuth, ($\cos \theta$),
    means for multiplying said signals representative of $\cos \theta$ with said signals representative of $V\Delta t$ to provide signals representative of $(V\Delta t)$ $(\cos \theta)$,
    means for subtracting said $(V\Delta t)$ $(\cos \theta)$ representative signals from said range signals to produce compensated range signals, and
    means for applying said compensated range signals to the input to said memory.

5. Apparatus as recited in claim 4 wherein said means responsive to said azimuth data signals to provide signals representative of $\sin \theta$ is a read only memory:
    said means responsive to said velocity representative signals to generate signals representative of $V\Delta t$ is a first rate multiplier means,
    said means responsive to said leading rate representative signals to generate signals representative $\dot{\theta}\Delta t$ is a second rate multiplier, and
    said means responsive to said azimuth data signals to provide signals representative of $\cos \theta$ is a second read only memory.

* * * * *